United States Patent [19]

Daimon et al.

[11] 4,045,241
[45] Aug. 30, 1977

[54] SYNTHETIC TAENIOLITE AND PROCESS OF PRODUCING THE SAME

[76] Inventors: Nobutoshi Daimon, 195-112, Aza Kanda, Mikuriya, Kawanakajima-cho, Nagano, Nagano; Toichiro Izawa, 25-26, Koganehara 7-chome, Matsudo, Chiba, both of Japan

[21] Appl. No.: 663,225

[22] Filed: Mar. 3, 1976

[51] Int. Cl.$^2$ .................................................. C09C 1/02
[52] U.S. Cl. .............................. 106/306; 106/DIG. 3; 423/331; 423/464
[58] Field of Search .................. 106/306, DIG. 3; 423/326, 331, 464

[56] References Cited
U.S. PATENT DOCUMENTS

| | | | |
|---|---|---|---|
| 2,987,777 | 6/1961 | Beaver | 423/331 |
| 3,001,571 | 9/1961 | Hatch | 106/DIG. 3 |

*Primary Examiner*—Patrick P. Garvin
*Assistant Examiner*—J. V. Howard
*Attorney, Agent, or Firm*—Wenderoth, Lind & Ponack

[57] ABSTRACT

This invention relates to a process of producing taeniolite having the formula, $LiMg_2Li(X_4O_{10})F_2$ (wherein X represents Si or Ge), which comprises mixing (a) lithium compound selected from the group of lithium oxide and lithium fluoride, (b) magnesium compound selected from the group of magnesium fluoride and magnesium oxide and (c) silicon oxide (or germanium oxide) in such a manner that the mixing ratio of Li : Mg : Si : (or Ge) : F becomes 1 : 1 : 2 : 1 (the fluoride is included in an excess amount of 10 – 30% to compensate the loss of fluorine during the process); melting the mixture at about 1,250° C–1,450° C and slowly cooling until the melt crystallizes.

This invention further relates to a water sol of flake-like ultra-fine particles of taeniolite produced in accordance with the above mentioned process, wherein each flake-like particle dispersed in water has a thickness of less than 150 A and a ratio of a diameter of the flat plane of the flake/the thickness of the flake being more than 100/1.

2 Claims, No Drawings

SYNTHETIC TAENIOLITE AND PROCESS OF PRODUCING THE SAME

DETAILED EXPLANATION OF THE INVENTION

This invention relates to a process of producing synthetic taeniolite which is a starting material for preparing a reformed mica, and a sol of the taeniolite produced therefrom.

It is well-known that finely divided mica particles are self-bonded to each other by the action of Van der Walls molecular cohesion forces. Heretofore, using this principle, naturally occurring finely divided muscovite particles have been formed into a film of reformed mica by means of electrophoresis or a paper-manufacturing process. Important factors in the preparation of reformed mica are particle size and particle shape of mica. One of the characteristics of the crystal structure of mica is that it is strong and elastic in the direction parallel to the crystal axis but the bonding between the layers of the crystal is a weak ionic bond and consequently layers of the crystal are easily cleft. Therefore, finely pulverized mica always becomes a flake-like particle having a large surface area regardless of pulverizing means such as compressing, abrading, bumping and cutting pulverizations. That is, the pulverized mica particle always has a flake-like shape large in length and width but extremely small in thickness. In order to prepare a reformed mica product, it is essential that the conditions the mica particles used should have a thickness of less than 150 A (i.e. a thickness of the flake) and that the ratio of an average diameter of the flat plane of the flake/the thickness should be more than 100/1.

Heretofore, it was only naturally occurring muscovite that was used as a starting material for preparing reformed mica product, but more recently reformed mica products having good properties in respect of heat-resistance, electric property and mechanical strength, prepared using a synthetic mica have been developed.

The synthetic mica thus used has substantially the same crystal structure as naturally occurring mica, but in the crystal structure of the synthetic mica —OH group of water of crystallization of natural mica is replaced by F. The synthetic mica is generally referred to as "fluorine-mica", and is prepared by mixing starting materials in a ratio approximately corresponding to its chemical formula, melting the mixture and slowly cooling the melt. A typical fluorine-mica is F-thlogopite, $KMg_3(AlSi_3O_{10})F_2$, from which various micas can be synthesized by replacing K. Mg and Al with other cations.

The fluorine-mica thus prepared by ion-exchanging (OH) with F has an excellent heat-resistance since F provides a very strong chemical bonding. For example, naturally occurring muscovite and thlogopite are decomposed at about 500° C and at about 800° C respectively, both releasing water of crystallization, while most synthetic micas are stable until 1000° C. In addition to this difference, naturally occurring mica contains impurities comprising mainly iron, while synthetic mica is chemically pure and therefore retains constant electrical properties. However, synthetic mica sometimes has the appearance of a glassy material fused on cleaving parts although its amount is very small, and therefore the cleaving property of the synthetic mica is poorer than that of natural mica. Thus, the conventional synthetic mica can not be cleft into particles sufficiently small to prepare a reformed mica. That is, the synthetic mica can be cleft into particles having a thickness of 200 A at the smallest, and most of the cleft particles have a thickness of more than 1000 A (0.1 μ). With regard to such large particles as mentioned above, it is difficult to expect a practically effective cohesive force.

In addition to F-thlogopite, another group of fluorine-mica is fluorine tetra-silicic mica having a general formula, $X_nY_{2.5-3}(Si_4O_{10})F_2$ wherein X represents monovalent of di-valent cations such as $K^+$ (having an ion radius of 1 A) or $Na^{30}$, $Li^+$, $Rb^+$, $Ti^{2+}$, $Cs^+$, $Ca^{2+}$, $Sr^{2+}$, $Ba^{2+}$ and $Rb^{2+}$ (having a little less ion radius) and Y which represents cations having an ion radius of 0.6 – 0.9 A such as $Al^{3+}$, $Mg^{2+}$, $Fe^{2+}$, $Co^{3+}$ and $Ni^{2+}$ or $Li^+$, $Ti^{2+}$, $Zn^{2+}$ and $Cu^{2+}$ present in combination with Mg. There are micas among various micas belonging to the tetra-silicic mica, which form hydrates with water. Such micas can be cleft by the action of hydration into small particles which provide the desired cohesive force. For example, Na-taeniolite expressed by the formula (a) $NaMg_2Li(Si_4O_{10})F_2$ or (b) $NaMgLi(Si_4O_{10})F_2$ and lithium fluoride type tetra-silicic mica expressed by the formula (c) $(LiF)_nMg_2Li(Si_4O_{10})F_2$ ($n$ = 1, 2, 3) form hydrates with water, and they are cleft by the action of hydration.

However, among these tetra-silicic micas, the yields of Na-taeniolite expressed by the formula (a) $NaMg_{2.5}(Si_4O_{10})F_2$ is very low, and therefore this mica has no practical use. The crystal structure of the mica generally has a three-layered lattice as a unit, which comprises of two $SiO_4$ tetrahedron layers and one octahedron layer, that is, $SiO_4$ tetrahedron layer - octahedron layer - $SiO_4$ tetrahedron layer. $Mg^{2+}$ which is introduced into the octahedron layer is generally $Mg_3$ in the case of tri-silicic mica and $Mg_2Li$ in the case of tetra-silicic mica. In this case of $Mg_{2.5}$, a deficiency type structure is formed wherein one of the six octahedron layers is vacant and free from ions. Consequently, the yield of the preparation of this mica is very low even if the starting materials are used in a stoichiometrical amount.

With regard to lithium fluoride type tetra-silicic mica expressed by the formula (c) $(LiF)_nMg_2Li(Si_4O_{10})F_2$ its composition is indefinite and it is difficult to industrially produce this type of mica which has a constant composition.

Among the above examples, it is Na-taeniolite expressed by the formula (b) $NaMg_2Li(Si_4O_{10})F_2$ only which can be constantly synthesized. This Na-taeniolite has been heretofore used to prepare a reformed mica product, and a sol of cleft fine particles of this mica is prepared according to the following steps (i) to (iv);

i. a crystal lump of the above Na-taeniolite prepared by the melting method is bathed in water, and the crystal lump is then easily cleft into small particles (average diameter = 3 – 6 mm) by absorbing water between the layers;

ii. these water-absorbing small particles are rapidly heated at 300° – 550° C to cleave the particles into much finer particles by the action of inflation and evaporation of water absorbed between the layers of crystal particles;

iii. the above steps (i) and (ii) are repeated thereby producing very fine flake-like particles having a thickness of 10 – 100 A wherein a ratio of a diameter of the flat plane of the flake/the thickness of the flake is 100/1 – 1000/1; and iv. a polar vehicle such as water or alcohol is mixed with the above-produced very fine particles to prepare a stable sol. The sol thus prepared is used alone or in combination with inorganic or organic fibers to form a film by means of coating, electrophoresis and paper-manufacturing techniques. The film is then subjected to ion-exchange procedure to replace Na+ with other non-hydratable cations such as K+, Ba²+, Al³+, Pb²+, Ag³⁰ and the like thereby preventing re-hydration. The film thus produced has a good electrical insulating property.

However, this conventional process has the following defects in industrial operation for practical use.

According to the conventional process, in step (i), the absorption of water between the layers is limited, that is, the hydration stops at the first stage (hydrate water = 4 $H_2O$). Therefore, it is impossible by this step (i) to obtain particles having a sufficiently small particle size to provide effective cohesive force. So, as in the above step (ii) it is necessary to rapidly heat the particles obtained in step (i) at 300° – 550° C to accelerate the cleavage of the particles by the action of inflation and evaporation of water absorbed between layers. However, since the single heating procedure does not always provide fine uniform particles, it is necessary, as in the above step (i) and the rapid heating of the step (ii) several times in order to of the step (ii) several times in order to complete the cleavage and to obtain very fine uniform particles effective for practical use. Moreover, the ion-exchange of the product of the particles thus obtained is not satisfactorily carried out and 0.1 – 0.4% of sodium ion still remains even after the ion-exchange. Consequently, the product does not always provide a good electrical property.

We have found in view of crystallography that the above mentioned defects can be removed by the use of synthetic lithium-taeniolite $LiMg_2Li(Si_4O_{10})F_2$ or lithium-germanium-taeniolite $LiMg_2Li(Ge_4O_{10})F_2$. The synthetic lithium-taeniolite and lithium-germanium-taeniolite prepared in accordance with the present invention are hydrated to such an extent as to contain hydrate water of more than 20 $H_2O$ and finally free water. Thus, the synthetic taeniolite of the present invention is boundlessly hydrated and cleft into ultra-fine uniform particles without employing a heating procedure. A sol of the ultra-fine particles thus prepared is stable and suitable for the preparation of reformed mica product.

The hydration reaction between water and mica is controlled under a certain constant rule, and proceeds in accordance with an inherent reaction mechanism depending on the ionic structure.

We have found as a result of study of hydration or swelling mechanism of mica that mica having hydratable structure has the following conditions:
a. the size of an ion between layers is small and hydration energy is high;
b. an ion of octahedron only is replaced and bonding between the layers is weak; and
c. the vacancy between layers is large.

According to X-ray analysis, the hydration mechanism of the synthetic lithium-taeniolite and lithium-germanium-taeniolite of this invention is further explained hereinafter in comparison with the conventional sodium-taeniolite.

The conventional Na-taeniolite is swollen to the mono-hydrate stage, i.e. $NaMg_2Li(Si_4O_{10})F_2\text{-}H_2O$ in air (R.H. = 60 – 90%), and is swollen to tetrahydrate, stage, i.e. $NaMg_2Li(Si_4O_{10})F_2\text{-}4\ H_2O$ in water. This is a limited swelling type hydration, and the hydration stops at the stage of tetra-hydrate and never proceeds any further. In order to obtain finer particles which provide effective cohesive force required in the preparation of a reformed mica product, the tetra-hydrate particles must be subjected to rapid heating as mentioned above.

On the other hand, the hydration mechanism of the synthetic lithium-taeniolite and lithium-germanium-taeniolite of this invention is a limitless swelling (free swelling) type hydration. That is, the synthetic Li-taeniolite (or Li-Ge-taeniolite) is swollen to tetra-hydrate stage, i.e., $LiMg_2Li(Si_4O_{10})F_2\text{-}4H_2O$ (or $LiMg_2Li(Ge_4O_{10})F_2\text{-}4\ H_2O$) in air, and is swollen to the 20-hydrate stage, i.e. $LiMg_2Li(Si_4O_{10})F_2\text{-}20H_2O$ (or $LiMg_2Li(Ge_4O_{10})F_2\text{-}20H_2O$) in water, and the hydrate water finally becomes free water (free swelling). The synthetic taeniolite of this invention starts to be plastic at the stage of water content of 50 – 60%, and becomes highly plastic clay-like at the stage of water content of 100%, and becomes stable gel at the stage of water content of 300%. The stable gel means the uniform dispersion of ultra-fine particles in solution wherein particles are not cohered to each other by the action of the same type electrical charge (-) of each particle, and suspend without settling.

The taeniolite of this invention is prepared by melting the following starting materials in an appropriate ratio.

The starting materials used in the preparation of the taeniolite of this invention include lithium oxide ($Li_2O$), lithium fluoride (LiF), magnesium fluoride ($MgF_2$), magnesium oxide (MgO), silica ($SiO_2$) and germanium oxide ($GeO_2$). Some of these materials are used in a mixed ratio corresponding to the composition of lithium-taeniolite (or lithium-germanium-taeniolite), i.e. $LiMg_2Li(Si_4O_{10})F_2$ (or $LiMg_2Li(Ge_4O_{10})F_2$, for example, 2LiF : 2MgO : 4$SiO_2$ (or 4$GeO_2$) or $Li_2O$ : $MgF_2$: MgO : 4$SiO_2$ (or 4$GeO_2$). This is a theoretical amount, but in practical fluorine-generating materials lithium fluoride and magnesium fluoride must be used in an excess amount of 10 – 30% in order to compensate the loss of fluorine during the process.

Melting procedure can be conducted by employing any of the well-known internally heating techniques; externally heating techniques using an alkali-resistant crucible made from platinum, SiC, graphite, beryllium oxide, alumina and the like; and electrically heating techniques using an electric conductor crucible made from platinum, SiO, graphite and the like or a furnace having conductive electrodes disposed.

According to the internally heating techniques, the mixture of starting materials is filled around a pair of carbon electrodes connected to a carbonaceous electrical heating element, and is melted applying an electric current thereto. After the carbonaceous electrical heating element disappears by oxidation, the melted starting materials which can be a resistive element having a resistivity of about up to 3 ohms, takes the place of the heating element. Thus, the melting is continued using the melt as a heating element and the sintered layer which forms around a container as a crucible. The melting is carried out at a temperature of 1250° C – 1450° C, preferably 1350° C, and the heating is continued until a sufficient volume of melt is obtained. The melt is slowly cooled thereby crystallizing. The cooling may be conveniently carried out by allowing the melt to stand. The crystal thus prepared is lithium-taeniolite (or lithium-germanium-taeniolite) expressed by the formula, $LiMg_2Li(Si_4O_{10})F_2$ (or $LiMg_2Li(Si_4O_{10})F_2$).

After cooling, a lump of the crystal is placed in a corrosion-resistant container, and cold water or hot water is pured thereon to cause hydration. The hydration is carried out until a milky white paste-like suspension is obtained, and thus the crystal is swollen to the stage of the state which contains at least 20 $H_2O$ hydrate water. The amount of water poured varies depending on the use of the product, but the swelling proceeds smoothly thereby forming a stable primary suspension when water is used in an amount of 10 – 20 times the weight of the crystal to be treated.

Before the above hydration reaction in water, the crystal lump is preferably pre-treated by being allowed to stand in an air or water vapor atmosphere in order to effect the hydration of the crystal to the tetra-hydrate state. By this pre-treatment, the crystal lump is decomposed into small particles having particle sizes of less than 5 mm. The particles thus obtained are just before the stage of being decomposed into ultra-fine particles, wherein cleavage proceeds latently within the particle. Accordingly the particles are quite easily and rapidly cleft into ultra-fine particles in water.

A crystal lump may be directly dipped into water without conducting the above pre-treatment, but in such a case the surface of the crystal lump becomes covered with a viscous layer formed by the hydration reaction. The viscous layer thus formed prevents water from entering into the internal part of the crystal structure, and therefore it takes a long time to complete the hydration reaction. However, if the pre-treatment step has been employed, the crystal lump is already decomposed into small particles to a certain extent, and the surface area of the crystal which comes into contact with the water becomes large. Consequently, the hydration proceeds smoothly and rapidly. The time required to cleave a crystal lump into desired ultra-fine particles according to the process using the pre-treatment step is almost 1/10 or less of the time required in the direct hydration process.

The primary suspension prepared in the above manner can be used as it is in an appropriate concentration for combining inorganic fibers and powders into a product which does not require strict electrical properties. In order to provide good electrical properties, unreacted materials and glassy materials included in the suspension must be removed therefrom. For this purpose, the primay suspension is adjusted to a concentration of less than 10 wt %, and the adjusted suspension is allowed to stand in several tanks in order while stirring to remove impurities such as unreacted materials and glassy materials by settling. Thus, a secondary suspension is obtained, and the secondary suspension is used in various concentrations depending on the use.

The suspension thus prepared is cohered and molded as it is into a product by dehydration and compression (to increase its mechanical strength), but the presence of $Li^+$ in the product reversibly causes re-hydration and swelling. Therefore such hydratable cations must be replaced by non-hydratable cations at the suspension stage or after being molded into a product, thereby making the product non-swellable. This cation-exchange can be conveniently carried out by bathing the suspension of the product in a salt solution containing $K^+$, $Ba^{2+}$, $Al^{3+}$, $Pb^{2+}$, $Ag^+$ or $Mg^{2+}$; for example 10 – 18% electrolytic solution such as KCOOH, $KNO_3$, $Ba(NO_3)_2$, $AlCl_3$, $Pb(NO_3)_2$, $AgNO_3$ and the like at from room temperature to 60° C.

It was observed by electron microscope that the Li-taeniolite (or Li-Ge-taeniolite) of this invention is cleft to a molecular size (1 – 5 molecules). Consequently, the ion-exchange is efficiently conducted and substantially no lithium ions remain.

More than 95% of the ultra-fine particles in the primary suspension are mica-flakes having a thickness of less than 100 A with the ratio of an average diameter of the flat plane of the flake to the thickness of the flake being more than 1000:1.

The sol of this invention is a very uniform dispersion in respect to particle size as compared with the sol of the conventional limited-swelling type mica. Accordingly, in comparison with the conventional sol, the sol of this invention can be more efficiently formed into a product by means of well known techniques such as screening paper-making techniques, electrophoresis techniques, dehydration by a centrifuge and casting techniques.

Thus, advantages of the sol of this invention in comparison with the conventional sol are as follows:

a. Ultra-fine particles are uniformly dispersed.
b. The particle sizes of the ultra-fine particles are almost equal with little variation.
c. Ion-exchange is effectively carried out since the crystal is fully cleft.
d. The concentration of the sol can be widely varied.
e. The viscosity of sol can be freely controlled.
f. The strength and flexibility of the product are notably improved since ultra-fine particles are uniformly dispersed and their particle sizes are almost equal.

The cleavage of conventional mica is limited, and therefore penetration and diffusion of ions is not complete. Consequently, 0.1 – 0.4% of the hydratable ions still remain after the ion-exchange. Due to this defect, the product of conventional mica is inferior to that of the synthetic taeniolite of this invention in respect of electrical properties and physical strength.

The synthetic taeniolite of this invention can be effectively used not only as electrical insulating material but also as thermal insulating material. For example, the synthetic taeniolite of this invention can be used in combination with mineral fibers such as glass, rock wool, silica, alumina, silicate and the like to prepare a non-flammable sheet. The non-flammable sheet thus prepared is highly flexible. The flexibility is due to the fact that ultra-fine particles of the synthetic taeniolite of this invention are flake-like particles uniformly cleft to molecular size, and the fact that the flakes are reformed into a product by uniform overlapping. Besides, the taeniolite itself has elasticity.

In addition to the above uses, the synthetic taeniolite of this invention is used as a base for various paints and as a starting material for the preparation of non-flammable building materials.

The present invention is further illustrated by the following Examples.

EXAMPLE 1

LiF 13.92%, MgO 21.62% and $SiO_2$ 64.46% were mixed together in a ball mill to prepare an intimate mixture of 100 kg of starting materials. The mixture was placed around a pair of carbon electrodes connected to a carbonaceous electrical heating element, and melted. After the carbonaceous electrical heating element disappeared by oxidation, the melted mica which can be a resistive element having a resistivity of up to 3 ohms took the place of the heating element. Thus, the melting was continued using the mica melt as a heating element and the sintered layer which formed around a container as a crucible. The melting was carried out at 1,350° C until a sufficient volume of melt was formed. The melt thus formed was then slowly cooled at a rate of 2° C/min. to crystallize. The crystal was lithium-taeniolite having the formula, $LiMg_2Li(Si_4O_{10})F_2$. A crystal lump having an average diameter of about 20 cm and a weight of 8 kg was placed in an atmosphere of 80% R.H. to decompose by hydration reaction into small particles having a maximum diameter of about 5 mm which is a stage having 4 $H_2O$ hydrate water. The crystal lump decomposed into fine particles within about 3 hours. The decomposed fine particles were then placed into a corrosion-resistant tank, and water 20° C was poured into the tank in an amount 15 times as large as the weight of the particles to carry out the hydration reaction. After which the hydration reaction was conducted until a milky-white paste-like hydrated material was obtained. In this manner, the first suspension of 130 liters was prepared. The fine crystal particles of mica suspended in the suspension were swollen until the hydrate water became free water exceeding 20 $H_2O$.

The above first suspension was diluted to a concentration of 10%, and was poured into a tank. The suspension was then mildly stirred in the tank to settle the remaining unreacted material and glassy material. This procedure was repeated three times to completely remove the unreacted and glassy materials. 200 cc of the second suspension thus prepared was subjected to an ion exchange procedure to replace hydratable Li ions with non-hydratable cations. The ion-exchange was carried out by adding 20 cc of a saturated solution of KCl to the suspension and heating the mixture at 60 ± 10° C for 50 hours. The ion-exchange may be conducted using a solution containing $Al^{3+}$ or $Pb^{2+}$. The ion-exchanged suspension was then filtered and the ion-exchanged fine particles on the filter were washed with distilled water. The washed fine particles were then placed in 200 cc of distilled water, and were dispersed again by means of ultrasonic waves (28 Mc).

A colloid of ion-exchanged taeniolite thus prepared contains particles cleft to the size of 1 - 5 molecules. Since the ion-exchange is completely conducted, there is substantially no remaining ions.

Colloids of lithium-taeniolite prepared in accordance with the present invention and the conventional sodium-taeniolite were respectively ion-exchanged with KCl, $AlCl_3$ and $Pb(C_2H_3O_2)_2$ saturated solutions, and the ion-exchange rate of alkali ions co-ordinated between layers was measured. The results are shown in the following Table 1.

Table 1

| Saturated Solution Used | Amount of Na(wt %) remained in the conventional Na-taeniolite | Amount of Li (wt %) remained in the Li-taeniolite of this invention |
|---|---|---|
| KCl | 0.35 | 0.07 |
| $AlCl_3$ | 0.19 | 0.07 |
| $Pb(C_2H_3O_2)_2$ | 0.17 | 0.05 |

Differences in the above ion-exchange capacities influence the mechanical and electrical properties of the products prepared when using the above two kinds of colloids. That is, the above two kinds of colloids were respectively formed into sheets having a thickness of 0.15 mm, and the mechanical and electrical properties were measured. The results are shown in the following Table 2.

Table 2

| | Sheet of the conventional Na-taeniolite colloid | Sheet of Li-taeniolite colloid of this invention |
|---|---|---|
| Tensile strength (kg/mm$^2$) | 85 *35 | 120 *400 |
| Insulation resistance (M ohm) | 5 - 100 | ∞ |
| Dielectric strength (KV/0,1 mm) | 0.8 - 1.0 | <2.0 |

*This sheet contains 5 % of glass fibers.

Results shown in Tables 1 and 2 were brought about due to improved ion-exchange capacity. The ion-exchange capacity depends on the distance between layers.

EXAMPLE 2

LiF 9.44%, MgO 14.63% and $GeO_2$ 75.93% were mixed to prepare an intimate mixture of 100 g of starting materials. The mixture was placed in a platinum crucible covered with platinum foil. The crucible was then placed in an electric furnace to melt the contents at 1350° C for 6 hours. The melt was then slowly cooled at a rate of 2° C/min. thereby producing 98 g of crystal lump. The crystal thus obtained was lithium-germanium-taeniolite having the formula, $LiMg_2Li(Ge_4O_{10})F_2$. One liter of water was then poured onto the crystal lump. The crystal lump was easily decomposed by hydration reaction to form a gel and the hydrate water became free water exceeding 20 $H_2O$ thereby forming 1,050 cc of stable suspension. The lithium-germanium-taeniolite thus produced had a larger particle size than the lithium-taeniolite prepared in Example 1, but the sol was easily molded into a product.

We claim:

1. A process of producing taeniolite having the formula, $LiMg_2Li(X_4O_{10})F_2$ wherein X represents Si or Ge, which comprises mixing (a) a lithium compound selected from the group of lithium oxide and lithium fluoride, (b) a magnesium compound selected from the group of magnesium fluoride and magnesium oxide and (c) silicon oxide or germanium oxide in such a manner that the mixing ratio of Li : Mg : Si or Ge : F becomes 1 : 1 : 2 : 1, the fluoride being included in an excess amount of 10 - 30% to compensate for the loss of fluorine during the process; melting the mixture at 1,250° - 1,450° C; and slowly cooling until the melt crystallizes.

2. A water sol of flake-like ultra-fine particles of taeniolite produced in accordance with claim 1, wherein each flake-like particle dispersed in water has a thickness of less than 150 A and a ratio of a diameter of the flat plane of the flake/the thickness of the flake being more than 100/1.

* * * * *